United States Patent
Frank et al.

(10) Patent No.: US 11,046,292 B2
(45) Date of Patent: Jun. 29, 2021

(54) METHOD FOR DECREASING A PREVAILING BRAKE PRESSURE IN A BRAKE CIRCUIT OF AN ELECTRONICALLY SLIP-CONTROLLABLE POWER BRAKING SYSTEM AND ELECTRONICALLY SLIP-CONTROLLABLE POWER BRAKING SYSTEM

(71) Applicant: Robert Bosch GmbH, Stuttgart (DE)

(72) Inventors: Daniel Frank, Kleinsachsenheim (DE); Tim-Philipp Jesse, Sachsenheim (DE); Kevin Wodrich, Erlenbach (DE)

(73) Assignee: Robert Bosch GmbH, Stuttgart (DE)

( * ) Notice: Subject to any disclaimer, the term of this patent is extended or adjusted under 35 U.S.C. 154(b) by 39 days.

(21) Appl. No.: 16/548,281

(22) Filed: Aug. 22, 2019

(65) Prior Publication Data

US 2020/0062226 A1 Feb. 27, 2020

(30) Foreign Application Priority Data

Aug. 24, 2018 (DE) .......................... 102018214353.6

(51) Int. Cl.
*B60T 8/17* (2006.01)
*B60T 13/68* (2006.01)

(52) U.S. Cl.
CPC .......... *B60T 8/1701* (2013.01); *B60T 13/686* (2013.01); *B60T 2270/10* (2013.01)

(58) Field of Classification Search
CPC ........ B60T 8/172; B60T 13/20; B60T 13/161; B60T 13/686; B60T 13/741; B60T 13/745; B60T 2270/10

See application file for complete search history.

(56) References Cited

U.S. PATENT DOCUMENTS 5,964,510 A * 10/1999 Nakazawa ............ B60T 8/4022
303/116.4
6,234,585 B1 * 5/2001 Harris ..................... B60T 7/042
303/113.4

(Continued)

FOREIGN PATENT DOCUMENTS

DE 102013205639 A1 10/2014

*Primary Examiner* — Thomas J Williams
(74) *Attorney, Agent, or Firm* — Norton Rose Fulbright US LLP; Gerard Messina

(57) ABSTRACT

A method for decreasing brake-pressure of an electronically slip-controllable power braking system (ESPBS) and an ESPBS. The wheel-brake pressure is generated by electronic activation of a drive motor (DM) of a pressure generator (PG) (external force). The driver indicates braking intention by actuating a master brake cylinder, which is set indirectly by a control unit via electronic activation of the DM. Plunger devices (PDs) include a plunger piston (PP), accommodated moveably in a plunger cylinder (PC). Driven by the DM, PP and PC execute a translational movement in relation to one another. A pressure buildup/decrease is performable in a BC connected to the PD as a function of movement direction. To avoid pressure medium contaminated with gas entering the BC undetected during pressure decrease after cancellation of the intention, actuation of the PD in the pressure-decrease direction is performed until the BC pressure has dropped to a pre-determinable threshold and ended.

4 Claims, 2 Drawing Sheets

(56) References Cited

U.S. PATENT DOCUMENTS 6,932,441 B2 * 8/2005 Hellmann .......... B60K 31/0008
303/125
2015/0360663 A1 * 12/2015 Svensson ................ B60T 8/171
701/70

* cited by examiner

METHOD FOR DECREASING A PREVAILING BRAKE PRESSURE IN A BRAKE CIRCUIT OF AN ELECTRONICALLY SLIP-CONTROLLABLE POWER BRAKING SYSTEM AND ELECTRONICALLY SLIP-CONTROLLABLE POWER BRAKING SYSTEM

RELATED APPLICATION INFORMATION

The present application claims priority to and the benefit of German patent application no. 10 2018 214 353.6, which was filed in Germany on Aug. 24, 2018, the disclosure of which is incorporated herein by reference.

FIELD OF THE INVENTION

The present invention relates to a method for decreasing a prevailing brake pressure in a brake circuit of an electronically slip-controllable power braking system according to the features of the species in claim 1, and an electronically slip-controllable power braking system according to the features of the species in the other independent claim 5.

BACKGROUND INFORMATION

In electronically slip-controllable power braking systems, in normal operation, the brake pressure in the wheel brakes of a brake circuit is not generated by a driver by muscle power, but rather by electronic activation of a drive motor of a pressure generator and accordingly via external force.

The driver merely specifies a possible braking intention, for example, by actuating a master brake cylinder of the power braking system, which is then set indirectly by an electronic control unit by a corresponding activation of the drive motor of the pressure generator.

A braking intention may also be set independently of the driver by the electronic control unit of a power braking system itself if it has been established on the basis of existing pieces of sensor information that, for example, driving and/or traffic situations have occurred which make a braking intervention necessary.

Plunger devices are known as pressure generators.

These devices include a plunger piston, which is accommodated moveably in a plunger cylinder and which delimits a plunger work chamber together with the plunger cylinder. Driven by the drive motor, the plunger piston and the plunger cylinder carry out a translational movement in relation to one another, due to which the volume of the plunger work chamber changes. A pressure buildup or a pressure decrease in a brake circuit contacted with the plunger work chamber may be carried out as a function of the direction of this translational movement using the plunger device. In the pressure buildup direction, the volume of the plunger work chamber decreases, in the pressure decrease direction, the volume successively increases.

With the aid of an additionally provided second electronically activatable valve device, the brake pressure provided by the pressure generator may be adapted in a wheel-specific manner to the slip conditions of a wheel of the vehicle associated with a wheel brake and thus an antilock braking control, an anti-slip regulation, and/or a vehicle stability control may be carried out.

The explained plunger device is connected via a snifting bore on the plunger cylinder to a pressure medium reservoir of the power braking system. This snifting bore is mechanically controlled by the relative movement between plunger piston and plunger cylinder. Pressure medium may flow out of a pressure medium reservoir of the power braking system into the plunger work chamber via the snifting bore or a possibly existing pressure difference between plunger work chamber and pressure medium reservoir may be equalized.

The hydraulic circuit diagram of such an electronically slip-controllable power braking system is shown, for example, in FIG. 1 of DE 10 2013 205 639 A1.

This design of an electronically slip-controllable power braking system has the disadvantage that an interface between pressure medium and atmosphere exists in the pressure medium reservoir and the power braking system is accordingly configured as an open system. If a low fill level of the pressure medium reservoir exists, pressure medium contaminated with gas may enter the plunger work chamber via this interface, such an introduction of gas only being recognizable with difficulty on the system side. The reason is that only ultrasmall quantities of pressure medium are to be added per braking process, and therefore the introduction of gas may be sufficiently small that existing test routines, because of tolerances, do not permit a reliable inference as to whether an introduction of gas has taken place at all.

Notwithstanding the lack of detectability of small introductions of gas, such introductions of gas are fundamentally undesirable in braking systems, since gas-loaded pressure medium endangers the pressure buildup in a brake circuit, lengthens the braking distance, and because gas dissolved in the pressure medium may possibly only be removed with substantial technical effort.

A power braking system is furthermore operable in a mechanical fallback level, in addition to the normal operation, if the explained buildup of a brake pressure by activation of the pressure generator should malfunction. In this fallback level, the brake pressure is generated by the driver actuating the master brake cylinder and relayed to the wheel brakes. In particular in the fallback level, gas inclusions in the pressure medium are noticeable in a particularly negative manner, because the actuating distance of the master brake cylinder is lengthened by them and therefore a correlation between brake pressure buildup and actuating distance is possibly disturbed in a manner perceptible by the driver. Furthermore, maintaining legal requirements for the brake pressure buildup in the fallback level is made more difficult because of the structurally restricted actuating distance of the master brake cylinder.

SUMMARY OF THE INVENTION

The provided method according to the features of claim 1 and the electronically slip-controllable power braking system according to the features of claim 5 yield the advantage over the related art that they minimize the probability of an undetected introduction of air into a brake circuit of a power braking system and thus improve the availability of the power braking system. Moreover, the robustness of the power braking system is enhanced, in particular also in relation to errors occurring at sensors which detect and evaluate the fill level of the pressure medium reservoir with pressure medium.

The present invention will be described on the basis of the drawings and explained in detail hereafter.

DETAILED DESCRIPTION

Figure 1:
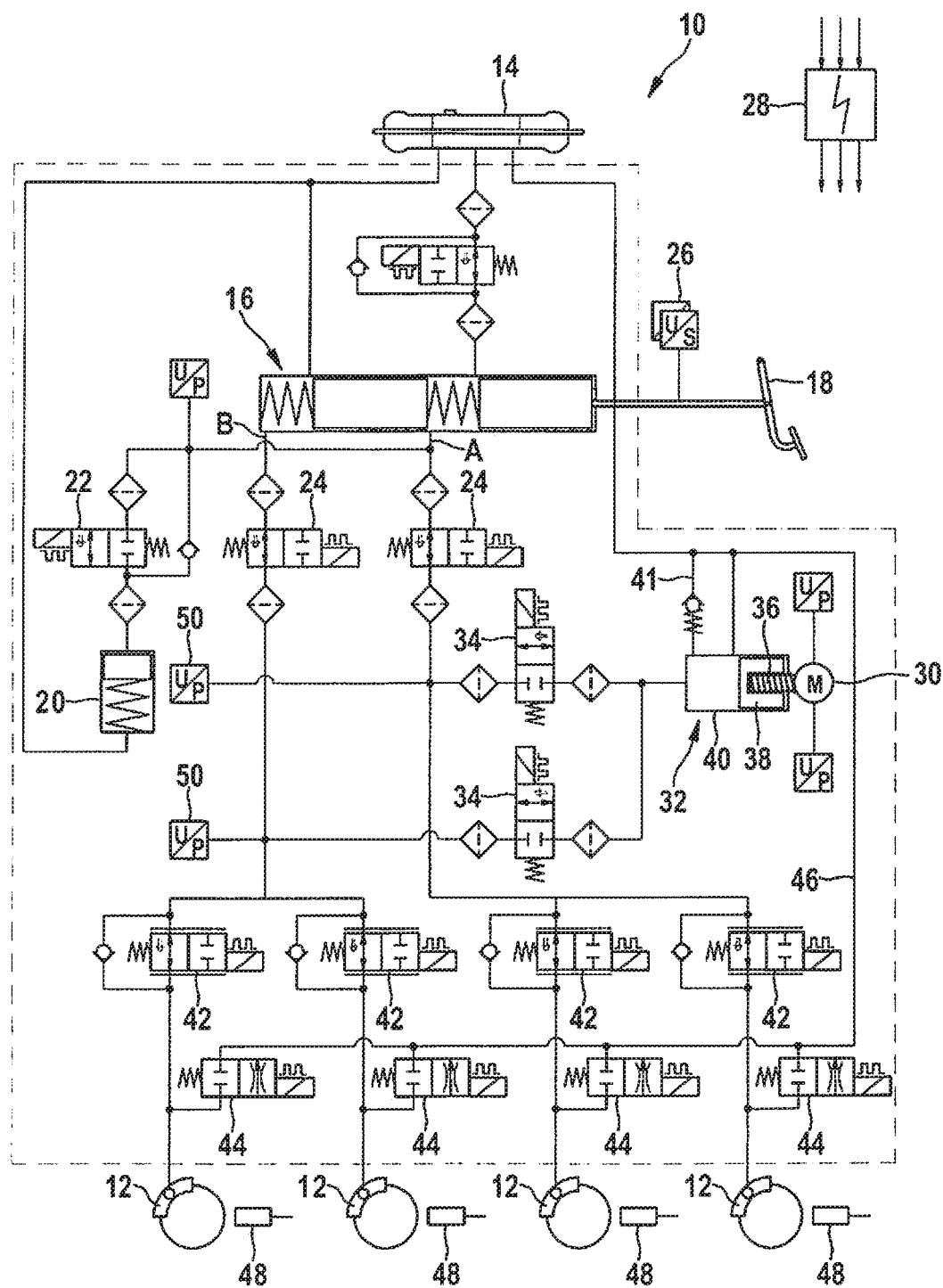
FIG. 1 shows the hydraulic layout of an electronically slip-controllable power braking system, on which the present invention is based and which is already known from the related art.

As already mentioned, FIG. 1 shows the hydraulic circuit diagram of an electronically slip-controllable power braking system underlying the present invention. Because this hydraulic circuit diagram is already part of the related art, the following description is restricted to that which is necessary for understanding the present invention.

The electronically slip-controllable power braking system according to FIG. 1 bears reference numeral 10. It includes by way of example a master brake cylinder 16 actuatable via a pedal 18 for specifying a braking intention. Two brake circuits A; B are connected by way of example to master brake cylinder 16, which are in turn each contacted with two wheel brakes 12. Master brake cylinder 16, brake circuits A; B, and wheel brakes 12 are supplied with pressure medium via a connected pressure medium reservoir 14.

A connection of master brake cylinder 16 to brake circuits A; B is controllable with the aid of an activatable first valve device 24; a second activatable valve device 42; 44 is associated with wheel brakes 12 and enables an individual control of the brake pressure of each individual wheel brake 12.

A brake pressure is provided by a plunger device 32, which is connected to brake circuits A; B in parallel to master brake cylinder 16. This plunger device 32 includes a plunger piston 38 accommodated is moveably in a plunger cylinder 40, which delimits a plunger work chamber together with plunger cylinder 40. Plunger piston 38 is drivable by an electronically activatable drive motor 30 via a downstream transmission 36 into a translational movement in the pressure buildup direction or opposite thereto in the pressure decrease direction. In the pressure buildup direction, the volume of the plunger work chamber decreases and in the pressure decrease direction, in contrast, it increases.

A provided third valve device 34 of power braking system 10 enables the decoupling of this plunger device 32 from brake circuits A; B if needed.

Power brake system 10 is finally equipped with an electronic control unit 28. This control unit 28 detects signals of existing sensors 12, 26, 50 and controls the mentioned three valve devices 24; 34, and 42, 44 and drive motor 30 of plunger device 32 for an adaptation of the brake pressure to the slip conditions at the wheels of the vehicle as needed. Braking processes may be carried out independently by the electronic control unit or may be carried out as a function of a braking intention predefined by the driver by the actuation of master brake cylinder 16.

In FIG. 1, the electronically activatable components are each shown in the non-actuated base position thereof.

The following background information on the method explained hereafter for the decrease of a prevailing brake pressure in a brake circuit of an electronically slip-controllable power braking system is to be taken into consideration:

This provided method may be used if an item of information is present in electronic control unit 28 of power braking system 10, according to which the pressure medium volume stored in pressure medium reservoir 14 has reached a minimum value or according to which pressure medium already loaded with gas is present. In principle, however, the method is applicable independently of these conditions and could also be applied in general, for example, for a decrease of a pressure level prevailing in a brake circuit A; B.

The mentioned low fill level of pressure medium reservoir 14 may be established, for example, by a pressure medium level sensor, whose output signal is supplied to an electronic control unit 28 of power braking system 10 and processed therein.

Gas contained in the pressure medium may also be reliably established up to a specific volume content by periodically repeatable test routines. Within the scope of these test routines, a pressure buildup in brake circuit A; B is carried out by actuating plunger device 32 and the curve of the pressure buildup (actual pressure curve) is compared to a setpoint pressure curve ascertained under ideal conditions, i.e., using pressure medium not loaded with gas. Deviations which may be established in the pressure increase gradients supply information about a possibly existing introduction of gas.

The decrease of a brake pressure in a power braking system 10 is conventionally carried out by an actuation of plunger device 32 in the pressure decrease direction, until as a result of the relative movement taking place between plunger cylinder 40 and plunger piston 38, the snifting bore of plunger device 32 opens and a pressure equalization is thus established between pressure medium reservoir 14 and plunger work chamber. This pressure equalization process is repeated from braking process to braking process. At a low fill level of pressure medium reservoir 14, it may have the result that due to the prevailing pressure conditions in brake circuit A; B, pressure medium loaded with gas gradually enters the plunger work chamber and thus brake circuit A; B. However, the volume of pressure medium flowing in may be sufficiently small in this case that a possibly penetrated gas volume may not be reliably established by subsequent test routines.

Therefore, to avoid undesirable recharging of gas-loaded pressure medium after each braking process, the present invention provides carrying out an actuation of plunger device 32 in pressure decrease direction not up to a complete pressure equalization, but rather only until a predefinable pressure threshold, for example, of 0.5 bar above atmospheric pressure, has been reached in brake circuit A; B. This mentioned pressure value is only to be understood as an exemplary value specification. The pressure value may be detected with the aid of pressure sensors 50 associated with brake circuit A; B and is provided in any case as a control variable in an electronic control unit 28 of power braking system 10.

If the predefined pressure threshold is reached, electronic control unit 28 interrupts the activation of drive motor 30 of plunger device 32 and the relative movement between plunger piston 38 and plunger cylinder 40 comes to a standstill. The pressure in the plunger work chamber or in brake circuit A; B, which is greater than the atmospheric pressure in this position of plunger device 32, prevents gas-loaded pressure medium from flowing out of pressure medium reservoir 14 into plunger work chamber or into the power braking system. The snifting bore of plunger cylinder 40 may still be closed or may already be open in this position of plunger device 32.

The residual pressure prevailing in brake circuit A; B is subsequently decreased by a corresponding electronic activation of first valve device 24, which controls a pressure medium connection of brake circuits A; B via master brake cylinder 16 to pressure medium reservoir 14.

The pressure medium draining out to pressure medium reservoir 14 is no longer available for subsequent brake pressure controls. Therefore, the actuating distance structurally available to plunger device 32 is successively shortened with each braking process controlled in this manner and the volume of the plunger work chamber decreases continuously. If the volume of the plunger work chamber has fallen to a predefinable limiting value, which is detectable, for example, on the basis of the actuating distance detected by electronic control unit 28 and/or the actuating duration of plunger device 32, new pressure medium is loaded from pressure medium reservoir 14 into the plunger work chamber by an actuation of plunger device 32 in the pressure decrease direction. For this reloading procedure, plunger device 32 is actuated in the direction of pressure decrease, specifically until the snifting bore in plunger cylinder 40 opens. At low fill level of the pressure medium accumulator, pressure medium loaded with gas may penetrate into the plunger work chamber, but because of the now greater volume of recharged pressure medium and a correspondingly higher volume of introduced gas, however, the probability rises that this introduced gas may be detected reliably with the aid of the explained test routines and in particular soon after introduction has occurred.

Therefore, in principle a check for an undesirable introduction of gas follows a recharging procedure of plunger device 32, this check using, for example, the above-explained test routine. Accordingly, brake pressure is initially applied to brake circuit A; B by plunger device 32 and the actual pressure curve is compared to the setpoint pressure curve. Individual wheel brakes 12 may be decoupled via second valve device 42 from particular brake circuit A; B. An introduction of gas may be recognized early on the system side on the basis of determinable deviations between the particular pressure gradients and may be indicated to the driver, for example, by outputting an acoustic or visual warning signal.

The described method is illustrated on the basis of the 3 diagrams of FIG. 2.

In diagram 2*a*, the pressure curve in the plunger work chamber of plunger device 32 is plotted over time for this purpose. From a plateau-like elevated pressure level, the pressure drops continuously from a point in time t1, until it has reached at a point in time t2 a predefined pressure level p1, for example, 0.5 bar greater than atmospheric pressure. This pressure level p1 drops to atmospheric pressure p0 at point in time t3 and rises again thereafter. At point in time t4, a second pressure plateau p2 elevated in relation to the atmospheric pressure is again reached.

Figure 2A:
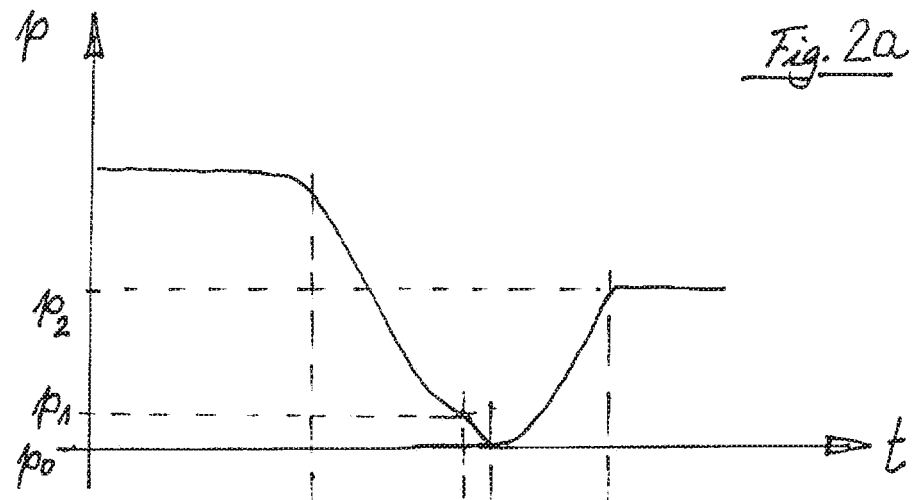
FIG. 2 shows a total of 3 diagrams recorded synchronously in time with one another, which represent the pressure in the brake circuit (FIG. 2a), the actuating distance of the plunger device (FIG. 2b), and the activation signal at a first valve device (FIG. 2c), each plotted over time.

Middle diagram 2*b* indicates, as already mentioned, the actuating distance of plunger device 32 over time synchronously in time with the pressure curve according to FIG. 2*a*. At point in time t1, plunger device 32 is actuated in the pressure decrease direction, i.e., a volume of the plunger work chamber increases continuously and the pressure prevailing in the plunger work chamber accordingly drops (see FIG. 2*a*). At point in time t2, the actuation of plunger device 32 ends. However, this device has not yet reached its structurally predefined end or reversal position at this point in time. In this position of plunger device 32, the snifting bore on plunger cylinder 40 is closed and in the plunger work chamber, reduced pressure level p1 is applied, for example, of 0.5 bar above the atmospheric pressure. The latter is apparent in FIG. 2*a*. At point in time t2, an electronic activation of first valve device 24 is ended, as is visible on the basis of the curve of the activation signal of first valve device 24 according to FIG. 2*c*. With a cancellation of the electronic activation of first valve device 24, it returns back into its base position. In this base position, first valve device 24 is open and establishes a pressure-medium-conducting connection from brake circuit A; B through master brake cylinder 16 to pressure medium reservoir 14 of power braking system 10. The pressure level in the plunger work chamber therefore drops at the point in time from t2 to t3 according to FIG. 2*a* to atmospheric pressure p0.

Figure 2B:
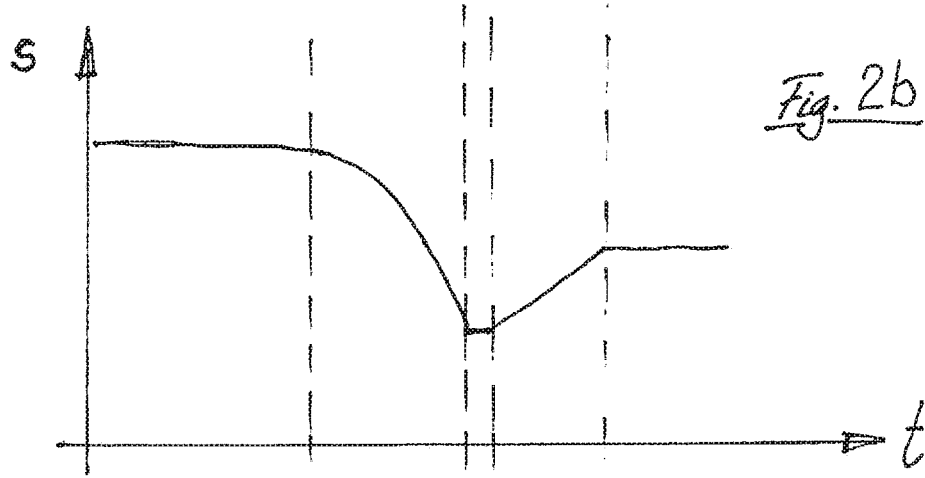
Figure 2C:
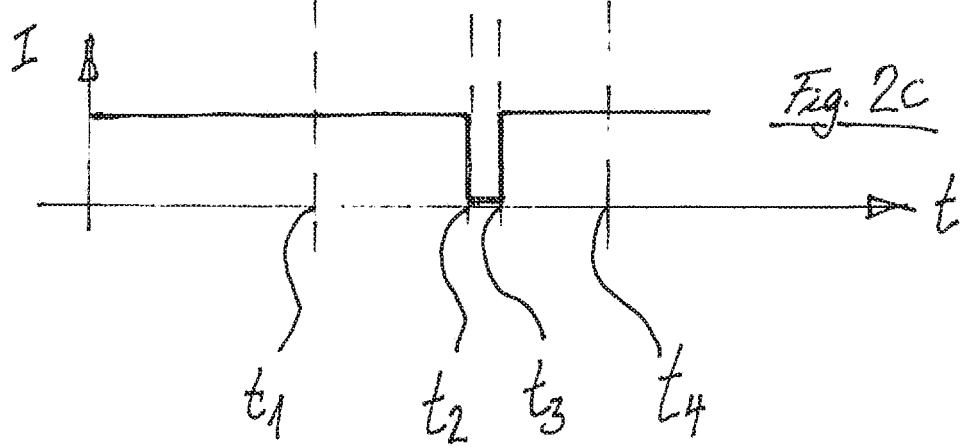

After the pressure decrease in brake circuit A; B is completed, plunger device 32 is actuated again at point in time t3, however, this time in the opposite direction, i.e., in the pressure buildup direction. FIG. 2*b* shows the actuation distance on the basis of the now rising characteristic curve and the pressure increase therefore taking place in the plunger work chamber or in brake circuit A; B as is apparent in FIG. 2*a*. In order that the pressure increase is possible at all, first valve device 24 has to be activated again at point in time t3. It thus changes from the open into its closed state and thus again blocks the pressure medium connection between brake circuit A; B and master brake cylinder 16.

Electronic control unit 28 of power braking system 10 compares the actual pressure curve of the pressure increase according to FIG. 2*a* to a known setpoint pressure curve and draws inferences on the basis of the differences between the particular pressure increase gradients about the quantity of gas dissolved in the pressure medium. A warning signal may optionally be sent to the driver by electronic control unit 28 to request the driver to have the power braking system checked in this regard.

Of course, modifications or additions to the described exemplary embodiment are conceivable, without departing from basic concept of the present invention formulated in the independent claims.

What is claimed is:

1. A method for decreasing a prevailing brake pressure in a brake circuit of an electronically slip-controllable power braking system after cancellation of a braking intention, the method comprising:

specifying a braking intention of the power braking system, which is equipped with a device for specifying the braking intention, wherein the power braking system includes: at least one wheel brake, which is connected to the brake circuit and to which brake pressure is applied, a pressure medium reservoir for supplying the brake circuit with pressure medium, an electronically controllable pressure generator actuatable by a drive motor and applies the brake pressure to the brake circuit, wherein the device includes a plunger device and a plunger cylinder, wherein a plunger piston is accommodated moveably in the plunger cylinder, and wherein a plunger work chamber is enclosed between the plunger cylinder and the plunger piston, whose volume decreases in the event of an actuation of the plunger device in a pressure buildup direction and increases in a pressure decrease direction, wherein the power braking system includes an electronically activatable first valve device for controlling a pressure medium connection of the brake circuit to the pressure medium reservoir, and an electronic control unit, at least for providing electronic activation of the drive motor and the first valve device; and canceling the braking intention, so that an actuation of the plunger device occurs in the pressure decrease direction until the pressure in the brake circuit has dropped to a predefinable pressure threshold greater than the atmospheric pressure and is ended upon reaching the pressure threshold;

wherein information about the fill level of the pressure medium reservoir and/or a gas volume included in the pressure medium being provided to the electronic control unit of the power braking system, and wherein the method is performed if the provided information signals that the fill level of the pressure medium reservoir has reached or fallen below a predefinable minimum fill level and/or if a plausibility check of the information about the fill level of the pressure medium reservoir is to be performed by the electronic control unit.

2. The method of claim 1, wherein upon reaching the pressure threshold, an electronic activation of the first valve device is performed so that an existing brake pressure in the brake circuit is decrease-able in the direction of the pressure medium reservoir.

3. The method of claim 1, wherein the pressure medium reservoir of the power braking system is equipped with a sensor device, which detects the fill level of the pressure medium reservoir with pressure medium, wherein the method is performed if a sensor signal has been sent by the sensor device to the electronic control unit, from which it is derivable for the electronic control unit that the predefinable minimum fill level has been reached or fallen below and/or if a functionality of the sensor device is checked by the electronic control unit.

4. An electronically slip-controllable power braking system, comprising:
   a device for specifying a braking intention;
   at least one wheel brake connected to a brake circuit of the power braking system and to which brake pressure may be applied;
   a pressure medium reservoir for supplying the brake circuit with a pressure medium;
   an electronically controllable pressure generator actuatable by a drive motor and which applies the brake pressure to the brake circuit, wherein the device includes a plunger device and a plunger cylinder, wherein a plunger piston is accommodated moveably in the plunger cylinder, and wherein a plunger work chamber is enclosed between the plunger cylinder and the plunger piston, whose volume decreases for an actuation of the plunger device in a pressure buildup direction and increases in a pressure decrease direction;
   an electronically activatable first valve device for controlling a pressure medium connection of the brake circuit to the pressure medium reservoir; and
   an electronic control unit, at least for providing electronic activation of the drive motor and the first valve device;
   wherein the electronic control unit of the power braking system is configured for decreasing a prevailing brake pressure in the brake circuit of the electronically slip-controllable power braking system after cancellation of the braking intention, by performing the following:
      specifying the braking intention of the power braking system via the device for specifying the braking intention, and
      canceling the braking intention, so that an actuation of the plunger device occurs in the pressure decrease direction until the pressure in the brake circuit has dropped to a predefinable pressure threshold greater than the atmospheric pressure and is ended upon reaching the pressure threshold;
   wherein information about the fill level of the pressure medium reservoir and/or a gas volume included in the pressure medium being provided to the electronic control unit of the power braking system, and wherein the electronic control unit is configured to perform the canceling of the braking intention if the provided information signals that the fill level of the pressure medium reservoir has reached or fallen below a predefinable minimum fill level and/or if a plausibility check of the information about the fill level of the pressure medium reservoir is to be performed by the electronic control unit.

* * * * *